May 10, 1938.  C. B. WATSON  2,116,991
BAROMETRIC DEVICE
Filed June 7, 1934.  3 Sheets-Sheet 1

INVENTOR
*Cornelius B. Watson*
BY
*W. S. McDowell*
ATTORNEY

May 10, 1938.  C. B. WATSON  2,116,991
BAROMETRIC DEVICE
Filed June 7, 1934   3 Sheets-Sheet 2

INVENTOR
Cornelius B. Watson
BY
ATTORNEY

May 10, 1938.  C. B. WATSON  2,116,991
BAROMETRIC DEVICE
Filed June 7, 1934  3 Sheets-Sheet 3
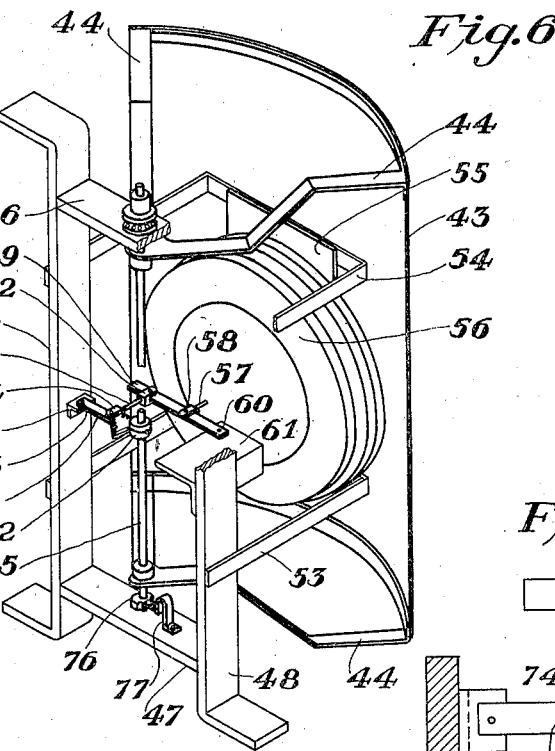
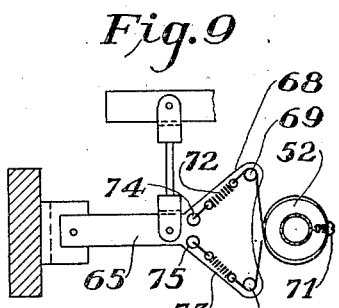
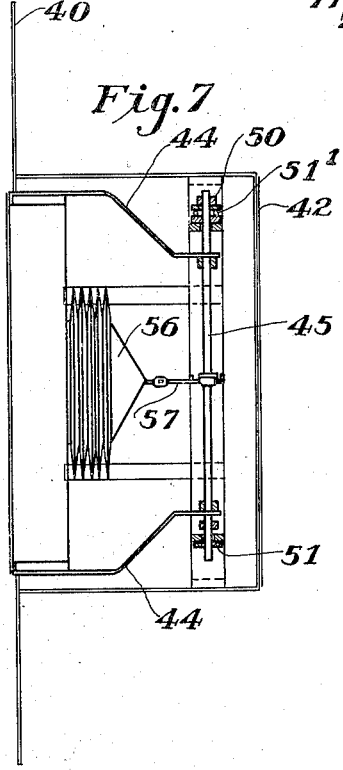
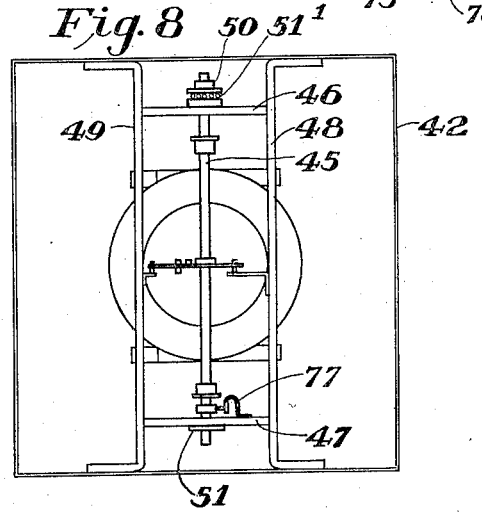
INVENTOR
Cornelius B. Watson
BY
ATTORNEY Patented May 10, 1938

2,116,991

UNITED STATES PATENT OFFICE 2,116,991

BAROMETRIC DEVICE

Cornelius B. Watson, Winnetka, Ill., assignor to The Pure Oil Company, Chicago, Ill., a corporation of Ohio Application June 7, 1934, Serial No. 729,469

8 Claims. (Cl. 73—4)

This invention relates to improvements in barometric devices and more particularly to devices suitable for use in connection with advertising signs.

Various means have been used for attracting attention in connection with road signs, such as devices which rotate by action of the wind, thermometers, flicker lights, luminous glass, and the like. The device in accordance with my invention utilizes an aneroid barometer to indicate weather conditions and thereby attract the eye of the observer to the advertising matter on the sign. The exposed face of the sign will carry words printed in large letters, such as stormy, change, fair, or any other words which indicate weather conditions, and in addition will bear any appropriate advertising matter. The advertising matter may be arranged in such a manner and be of such a nature that it will bear some significance to the particular weather condition indicated.

In order to more clearly understand my invention, reference is made to the accompanying drawings of which Figure 1 is a front perspective view partially cut away showing one embodiment of the invention.

Figure 6 is a rear perspective view of the actuating mechanism of Figure 4.

Figure 7 is a side elevational view of the actuating mechanism shown in Figure 6.

Figure 8 is a rear elevational view corresponding to Figure 6.

Figure 9 is an enlarged plan view of a part of the actuating mechanism shown in Figure 6.

Figure 1:
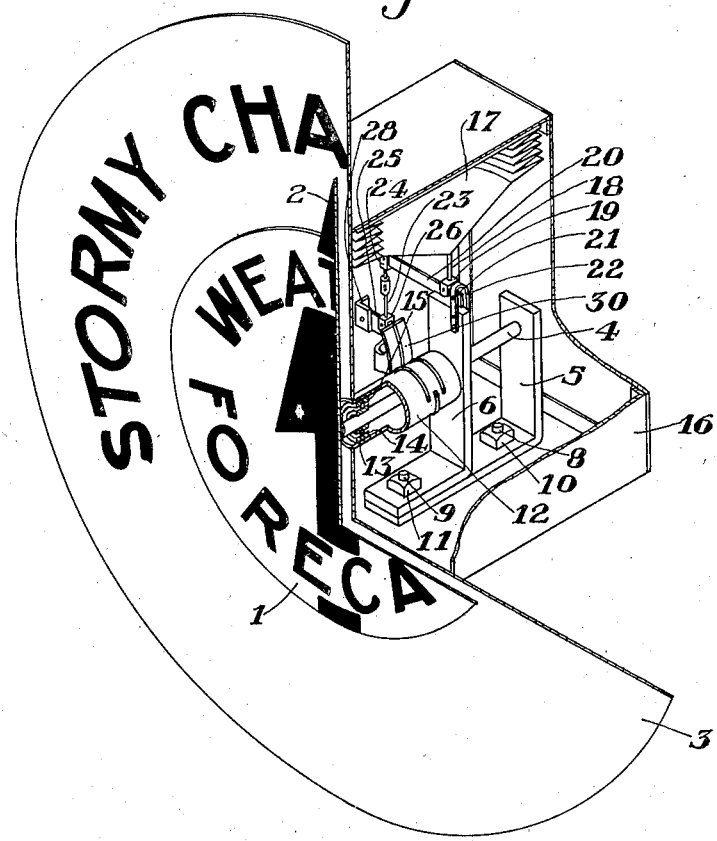
Figure 2:
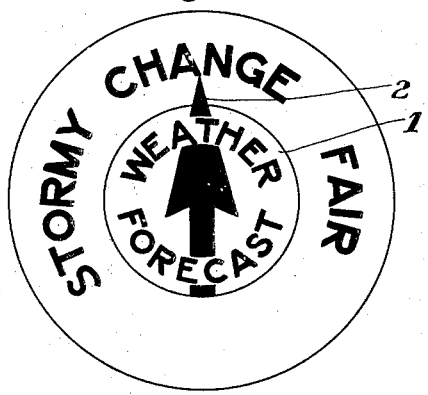
Figure 2 is a front elevational view on a smaller scale of the device shown in Figure 1.
Figure 3:
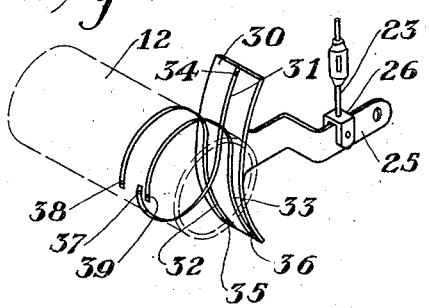
Figure 3 is an enlarged perspective view of a part of the actuating mechanism of Figure 1.
Figure 5:
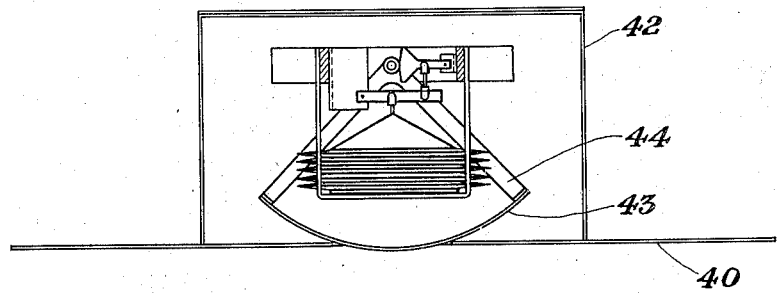
Figure 5 is a plan view of the device shown in Figure 4.
Figure 4:
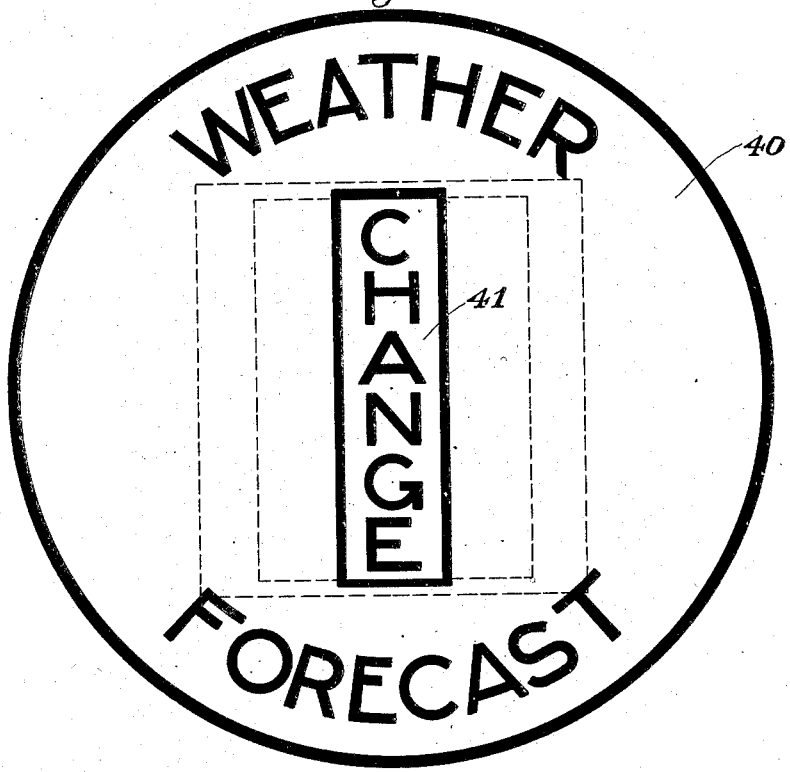
Figure 4 is a front elevational view of another embodiment of my invention.

Referring to Figures 1 to 3; 1 is a circular disc carrying the pointer 2, and 3 is an enlarged circular disc rotatably mounted behind the disc 1. These discs may be formed of wood, metal, or other suitable material. As shown on the drawings, appropriate words will be printed on the face of the disc to indicate weather forecast and different types of weather. The disc 1 is rigidly mounted on the shaft 4 which in turn is rigidly mounted in the brackets 5 and 6. These brackets are bolted to a suitable standard or support, not shown, by means of bolts 8 and 9 and nuts 10 and 11.

Rotatably mounted on the shaft 4 is a hollow cylinder or shaft 12. The disc 3 is rigidly mounted on the outer end of the shaft 12. The shaft 12 is mounted to rotate on the shaft 4 on ball-bearings 13 which are mounted at each end of the shaft in a roll race between the cone 14 and the cup 15.

The casing 16 encloses the actuating mechanism and protects it from the wind, rain, dust, etc., which would interfere with the proper operation of the mechanism. This casing may be made of metal or other suitable material. Fixed to the top of the casing is the bellows 17. The rod 18 is connected to the apex of the bellows, and the opposite end of the rod is pivotally connected by means of link 19 to the lever arm 20, one end of which is pivotally connected at 21 to the yoke 22. Yoke 22 is rigidly fixed to the upper end of the bracket 6. The adjustable rod 23 is pivotally connected to the opposite end of the lever arm 20 by means of the connecting link 24, and the lower end of the rod 23 is pivotally connected to the arm 25 by means of the connecting link 26. The arm 25 is pivotally connected at one end to the bracket 28 which is rigidly mounted on the side of the casing 16. The arm 25, shown in detail in Figure 3, is double bent at right angles in order to bring the other end opposite a portion of the shaft 12, and on the other end carries a vertically disposed arcuate plate 30. To the upper end of the plate 30 is fastened a metal band 31, and to the lower end of the plate are fastened the bands 32 and 33. The bands are fastened at the points 34, 35, 36 respectively. The band 31 passes underneath and half way around the shaft 12 and is fastened thereto at the point 37. The bands 32 and 33 pass over and half way around the shaft 12 and are fastened thereto at the points 38 and 39. By providing two bands attached to the lower end of the plate and attaching the band 31 in the center of the plate, side thrust is avoided.

The device operates as follows:

Change in atmospheric pressure causes variations in the volume of the bellows. For example, if the atmospheric pressure increases, the volume of the bellows will decrease thereby lifting the rod 18 which in turn lifts the lever arm 20. The length of the portion of the lever arm between the connection 21 and the connection 24 is large in proportion to that part between the connections 19 and 21 thereby multiplying the motion imparted to the rod 23. The arm 20 through the connecting rod 23 in turn lifts the arm 25. The rod 23 is connected to the arm 25 at such a point that it will multiply the distance through which plate 30 on the end of the arm 25 moves. As the plate moves upwardly, it rotates the shaft 12 by means of the pull of the band 31. The disc 3 being rigidly fixed to the shaft 12 will rotate with it and the pointer 2 fixed to the stationary disc 1, will, in conjunction with the words written on the face of the disc 3, indicate that the weather is changing or will be stormy.

If the atmospheric pressure decreases the bellows will expand and lower the actuating mechanism thereby causing the shaft 12 to rotate in the opposite direction and show a change in the weather or indicate fair weather.

In the modification shown in Figures 4 to 9, instead of having a disc which rotates in a vertical plane on a horizontal axis, the actuating mechanism is connected to an arcuate shaped plate which rotates on a vertical axis. The numeral 40 indicates a vertical disc upon which words such as weather forecast together with appropriate advertising matter is printed. In the center of the disc 40 is a vertically elongated slot or aperture 41. Attached to the rear of the disc is a metal or other casing 42 which houses the actuating mechanism. The vertically disposed arcuate plate 43 is rotatably mounted behind the disc 40, and has appropriate words such as stormy, change, fair, vertically printed thereon at spaced intervals so that the words will register with the slot 41 as the plate rotates. The plate 43 is rigidly mounted by means of the brackets 44 on the vertical shaft 45, which is in turn rotatably mounted in the cross pieces 46 and 47 fixed between the vertical supports 48 and 49. The supports are fixed to the top and bottom of the casing 42 and may be bolted to a suitable standard or support not shown. The shaft 45 is retained in the cross pieces 46 and 47 by means of the collars 50 and 51 fixed to the upper and lower ends of the shaft respectively.

A thrust bearing 51¹ is placed on the shaft between the collar 50 and cross piece 46 in order that the shaft may rotate on ball-bearings. A pulley 52 is rigidly mounted on the middle of the shaft.

Brackets 53 and 54 are mounted on the supports 48 and 49 and carry the vertical flat panel 55 upon which is mounted the bellows 56. Fixed to the apex of the bellows is the adjustable rod 57 which in turn is pivotly connected by means of the connecting link 58 to the lever arm 59. The lever arm 59 at one end is pivotally mounted at 60 on the bracket 61 which in turn is rigidly fixed to the support 48. The arm 59 is adapted to swing in a horizontal direction. Near the opposite end, the arm 59 is pivotally connected by means of the connecting link 62 to the rod 63 which in turn is pivotally connected by means of the connecting link 64 to the arm 65. The length of the portion of the lever arm 59 between the links 58 and 62 is large in comparison to the portion between the link 58 and the pivot 60 thereby imparting increased motion to the rod 63.

The arm 65 is pivotally mounted at 66 to the bracket 67 which in turn is rigidly fixed to the support 49. The arm 65 is adapted to swing in a horizontal direction.

The opposite end of the arm 65 is formed into a flat plate 68, more clearly shown in Figure 9. Near the outer ends of the plate 68 are mounted the rollers 69 and 70. A wire or metal tape is once wrapped around the pulley 52 and fastened thereto by means of the screw 71. The tape or wire passes around the outer sides of the rollers 69 and 70 and the ends thereof are connected to the ends of coil springs 72 and 73. The opposite ends of the coil springs are fastened to the plate 68 at the points 74 and 75.

A notched wheel 76 is rigidly fixed to the shaft 45 near the lower end thereof but above the lower cross piece 47. A spring dog or detent 77 is rigidly mounted on the upper side of the lower cross bar 47 and is adapted to co-act with the notched wheel 76. The wheel 76 has three notches so spaced that when a word on the arcuate plate 43 is in registration with the slot 41, a notch is in registration with the detent 77.

The device operates as follows:

Assuming the atmospheric pressure is increasing, the volume of the bellows will decrease, and through the rod 57 will exert a pull on arm 59 which in turn through the connecting rod 63 will exert a pull on the arm 65. The arm 65 will be pulled in a direction toward the bellows and increase the tension of the spring 72. This increased tension will tend to rotate the shaft 45 in a clockwise direction but is prevented from doing so by means of the detent 77 which cooperates with the notches in the wheel 76. However, when the atmospheric pressure becomes great enough and causes the arm 65 to move through a great enough distance, the tension of the spring 72 is increased to such an extent that the pull exerted on the shaft is sufficient to overcome the retaining force of the detent 77 and the shaft rotates until the detent is in registration with the next notch in the shaft when the shaft will be stopped and remain stationary in its new position. The rotation of the shaft relieves the tension on the spring 72.

Likewise, with decreasing pressure the bellows will expand and exert an opposite force on the levers, tending to cause the shaft to reverse its motion and thereby causing the shaft 45 and plate 43 to rotate in the opposite direction.

It will be evident that in using the second modification, by providing a mechanism wherein the plate 43 can be moved only when the pressure has attained a certain predetermined value, the particular weather will always be indicated with certainty. It will of course be necessary to balance the tension of the springs 72 and 73 and the spring of the detent 77 so that the mechanism will cause rotation of the shaft when the atmospheric pressure has reached an amount which is indicative of the weather described by the words printed on the plate 43.

In connection with the second modification appropriate advertising may be printed or painted on the face of the disc 40 as well as on the plate 43, and the advertising matter on the plate may be appropriate to the particular weather indicated.

It will be understood that my invention in its broadest sense relates to advertising devices used in connection with an aneroid barometer, and is intended to include other modifications of equivalent scope.

I claim:

1. A barometer device comprising a stationary member, an aperture in said member, a rotatable member carrying spaced groups of indicia mounted on a shaft for exposure of a single group of indicia through said aperture, an aneroid, means connecting said aneroid to said shaft to cause it to rotate by variations in atmospheric pressure, and means yieldably restraining rotation of said shaft until atmospheric pressure reaches certain predetermined values whereby to ensure a full exposure of a single group of indicia through said aperture.

2. A device of the character described comprising a stationary member, an aperture in said member, a rotatable member carrying spaced groups of indicia mounted on a shaft for exposure of a single group of indicia through said aperture, barometric means operably connected to rotate said shaft, and means yieldably restraining rotation of said shaft until atmospheric pressure reaches certain predetermined values whereby to ensure a full exposure of a single group of indicia through said aperture.

3. A device of the character described comprising a board having a display aperture, a panel rotatably mounted on a shaft behind said aperture and barometric means operably connected to said shaft to rotate said panel, and means yieldable at predetermined barometric pressures for retaining said panel in certain predetermined positions.

4. A device of the character described comprising a board having a display aperture, a panel rotatably mounted on a shaft behind said aperture and barometric means for rotating said panel in both directions past said aperture, and means permitting rotation of said shaft only when predetermined changes in atmospheric pressure occur and for stopping said panel at predetermined points in its arc of rotation.

5. A barometric device comprising a stationary board, a rotatable panel adapted to coact with said stationary board to indicate atmospheric conditions, said rotatable panel being mounted on a shaft, an aneroid, an arm pivotally mounted adjacent one end, means connecting said aneroid to said arm intermediate the ends thereof whereby to reciprocate said arm by means of said aneroid, flexible bands fastened at one end to the other end of said arm at least two of said bands being wrapped about said shaft in opposite directions and fastened at the other end to said shaft.

6. A device of the character described comprising an upright surface having an aperture therein, an arcuate panel adapted to rotate behind said surface, said panel being mounted on a vertical shaft, legends on said panel adapted to register with said aperture, an aneroid connected to and adapted to rotate said shaft, and a yieldable detent in operative engagement with said shaft to permit rotation of said shaft only at certain predetermined barometric pressures.

7. A device of the character described comprising a rotatable shaft, a disc or plate rigidly mounted on said shaft and adapted to rotate therewith, a pivotally mounted arm mounted perpendicularly in relation to said shaft, with the free end of the arm adjacent to said shaft, flexible tape or bands fastened to said arm and to said shaft in such manner as to cause said shaft to rotate when said arm is oscillated, an aneroid, and means for actuating said arm through said aneroid.

8. A device of the character described comprising a stationary member, an aperture in said member, a rotatable member carrying spaced groups of indicia, each group of indicia including a word or words designating a function of atmospheric pressure, said indicia being arranged to register with said aperture, atmospheric pressure responsive means for actuating said rotatable member and means cooperating with said rotatable member for restraining actuation of said rotatable member sufficiently to cause rotation only when the barometric pressure has changed a predetermined amount to ensure a full exposure of a single group of indicia through said aperture.

CORNELIUS B. WATSON.